United States Patent [19]

Keryhuel et al.

[11] Patent Number: 4,743,129
[45] Date of Patent: May 10, 1988

[54] PASSBOOK PRINTER

[75] Inventors: Alain Keryhuel, Yerville; Pierre Dupuis, Barentin, both of France

[73] Assignee: Unisys Corporation, Blue Bell, Pa.

[21] Appl. No.: 796,028

[22] PCT Filed: May 17, 1985

[86] PCT No.: PCT/GB85/00209

§ 371 Date: Apr. 11, 1986

§ 102(e) Date: Apr. 11, 1986

[87] PCT Pub. No.: WO85/05325

PCT Pub. Date: Dec. 5, 1985

[30] Foreign Application Priority Data

May 18, 1984 [GB] United Kingdom ............... 8412707

[51] Int. Cl.$^4$ ............................................. B41J 13/32
[52] U.S. Cl. ................................. 400/582; 400/630;
400/708; 400/583.3; 400/578; 400/579;
400/596; 101/233; 271/245; 271/227; 235/479;
235/485
[58] Field of Search .................... 382/46.61; 235/474,
235/479, 436, 437, 480, 485; 271/245, 227;
400/719, 708, 708.1, 578, 583.3, 582, 630–632,
579, 596; 101/91, 232, 233

[56] References Cited

U.S. PATENT DOCUMENTS

| 3,814,227 | 6/1974 | Hurd, III et al. | 400/124 |
| 3,849,631 | 11/1974 | Merlino, Jr. et al. | 235/474 |
| 3,951,251 | 4/1976 | Zaccagnino, Jr. | 400/124 |
| 4,015,523 | 4/1977 | Evans et al. | 101/233 |
| 4,265,556 | 5/1981 | Kiieg et al. | 400/342 |
| 4,424,587 | 1/1984 | Wevelsiep et al. | 382/46 |
| 4,442,769 | 4/1984 | Kallin | 400/630 |
| 4,470,591 | 9/1984 | Acquaviva | 271/245 |
| 4,569,611 | 2/1986 | Watanabe | 400/631 |
| 4,589,143 | 5/1986 | Baur et al. | 382/61 |

FOREIGN PATENT DOCUMENTS

| 2464523 | 3/1981 | France . | |
| 45218 | 4/1977 | Japan | 400/583.3 |
| 56-162177 | 12/1981 | Japan . | |
| 137180 | 8/1982 | Japan | 400/708.1 |
| 31788 | 2/1983 | Japan | 400/583.3 |
| 58-55270 | 4/1983 | Japan | 400/579 |
| 58-92031 | 6/1983 | Japan | 400/708 |
| 29185 | 2/1984 | Japan | 400/708 |
| 1175146 | 12/1969 | United Kingdom | 101/415.1 |
| 1516204 | 7/1975 | United Kingdom | 400/631 |
| 2011861 | 7/1979 | United Kingdom | 400/625 |

OTHER PUBLICATIONS

Bullock et al. IBM Technical Disclosure Bulletin vol. 19, No. 5, pp. 1955–1956 11/76.
Smith, IBM Technical Disclosure Bulletin vol. 20, No. 3, p. 904 8/77.

Primary Examiner—William Pieprz
Attorney, Agent, or Firm—Mark T. Starr

[57] ABSTRACT

A passbook printer uses a conveyor belt (16) to urge a passbook (86) towards a raised barrier (40) for the passbook (86) to strike the barrier (40) and then have one edge thereof aligned with the barrier (40) by sliding engagement with the conveyor belt (16). After alignment, the barrier (40) is lowered and the passbook (86) is advanced beneath a printhead and sensor assembly (38) which senses the orientation of the passbook (86) and prints thereon in a correct and upright manner regardless of the orientation of the passbook (86).

22 Claims, 13 Drawing Sheets

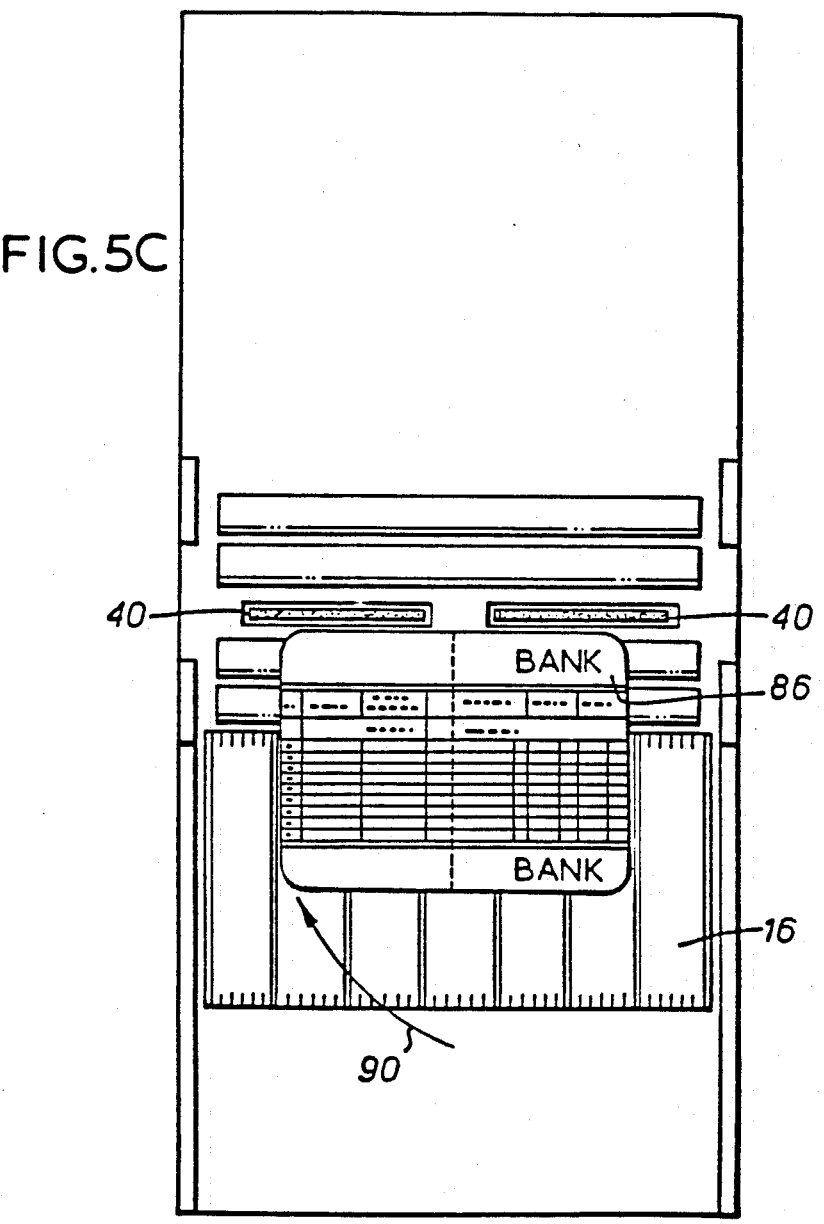

FIG. 6

| No | DATE | DESCRIPTION | CASHIERS SIGNATURE | AMOUNT | BALANCE |
|----|------|-------------|--------------------|--------|---------|
| | | ACCOUNT No.12345 | | BALANCE FWD. | 2001 60 |
| 1 | 1 FEB 83 | WITHDRAWAL | J.J. | 96.20 | 1905 40 |
| 2 | 2 MAR 83 | DEPOSIT | A.E. | 561.30 | 2466 70 |
| 3 | | | | | |
| 4 | | | | | |
| 5 | | | | | |
| 6 | | | | | |
| 7 | | | | | |
| 8 | | | | | |
| 9 | | | | | |

PASSBOOK PRINTER

The present invention relates to a printing apparatus for use as part of a teller terminal in automatic banking equipment for printing a record of a banking transaction on a passbook for the information and retention of the banking customer.

Modern banking practice includes the use of so-called teller terminals for use by individual bank tellers in communicating with a supervisory data processing system. As well as keyboard and display units, it has become the practice to include in teller terminals a printer for printing customer passbooks.

When a passbook is printed, the teller opens the passbook at the latest page and indicates on the keypad which line of the passbook is next to be filled in. The opened passbook is then inserted into the passbook printer and the supervisory data processing system commands the passbook printer to print details on the open passbook at the indicated line according to information fed to the supervisory data processing system by the teller through his or her keypad.

It is the custom in the design of passbook printers to provide a narrow slot wherethrough the opened passbook is fed by hand. This requires some precision of operation and can slow down the customer servicing rate of an individual teller. Further, because the passbook is fed through a narrow slot, there is a maximum thickness to the passbook which can be accommodated as well as a maximum height or length thereto, dependent upon the depth of the slot. Yet further, the passbook must be fed into the slot in a predetermined attitude or else the printer will not function and will print in the wrong place.

It is, therefore, desirable to provide a passbook printer whereon no precision of position of the passbook is required prior to printing, where a thick passbook may be accommodated as well as a thin passbook and wherein correct printing of the passbook may proceed regardless of the attitude of provision of the passbook to the printer.

According to a first aspect, the present invention consists in a passbook printer comprising; a barrier, a conveyor belt, a transport apparatus and a printhead assembly, said printer being operable to print a visible record on a passbook in a sequence of operations including; the raising of said barrier; subsequent to the placing of an open passbook on said conveyor belt, the operation of said conveyor belt for a predetermined period for said conveyor belt to convey the passbook towards said barrier for the passbook to engage said barrier and to have an edge of the passbook become aligned with the barrier in consequence of sliding engagement between said conveyor belt and the passbook; and thereafter the lowering of said barrier for the passbook to be free to pass thereover and the operation of said transport apparatus to engage the passbook to transport the passbook a selectable distance towards said printhead assembly for said printhead assembly to make the visible record at a selectable position on said passbook.

According to another aspect, the present invention consists in a passbook printer according to the first aspect further characterised by the printhead assembly comprising a sensor, moveable transversely to the path wherein said transport apparatus is operable to transport the passbook to detect the transverse position of the passbook, said printhead assembly further comprising a printhead operable thereafter to print the visible record at a selectable distance transversely to said passbook from the point whereat said sensor detects the passbook.

According to another aspect, the present invention consists in a passbook printer further characterised by said sensor being operable to detect a mark on the passbook, said printhead assembly being operable to measure the distance transversely to the path wherein said transport apparatus is operative to transport said passbook between said point whereat said sensor detects said passbook and the point whereat said sensor detects said mark to detect which edge of the passbook has become aligned with said barrier.

In a preferred embodiment of the present invention; a passbook printer is provided having a flat bed comprising a feed tray, a conveyor belt, a printing bed and a raisable barrier. An open passbook is placed upon the feed tray with a portion of the passbook resting on the conveyor belt. The passbook printer is activated and responds by raising the barrier across the flat bed. The barrier is provided in the vicinity of the printing bed. The passbook printer then activates the conveyor belt which draws the passbook from the feed tray towards the barrier. The passbook collides with the barrier and by sliding engagement with the conveyor belt one of the passbook's edges is aligned with the barrier. After the conveyor belt has been running for a predetermined time, sufficient to achieve the above action, the conveyor belt is switched off and the barrier is lowered out of the plane of the flat bed.

The passbook printer comprises a transport apparatus consisting in two spaced pairs of drive rollers in the flat bed, together with a set of lowerable clamp rollers. As soon as the barrier is lowered, the passbook printer lowers the clamp rollers onto the passbook to grip the passbook against the drive rollers. The drive rollers are advanced by measurable increments, preferably using a stepping motor. All of the drive rollers move in concert from a common drive source. The drive rollers can be used to move the now aligned passbook a selectable distance to and fro on the flat bed.

A printhead assembly lies behind the barrier and comprises a sensor and a matrix print head on a common belt driven by a common stepping motor transversely to the direction of movement wherein the transport apparatus is operable to move the passbook. The sensor is preferably an optical sensor.

Having lowered the barrier, the drive rollers move the passbook forward a predetermined number of steps to lie beneath the printhead assembly. The passbook printer moves the sensor and printhead to a start position and thereafter sweeps the sensor across the passbook to detect where its edge begins. The printhead is a predetermined number of steps behind the sensor so that the passbook printer knows at all times thereafter where the printhead is relative to the edge of the passbook by means of counting the number of steps imparted to the printhead and sensor assembly.

The passbook is provided with two kinds of pre-printing. The first type of pre-printing is made with thin lines and the second type with thick lines. The sensor is moved across the passbook. The thin lines keep the optical sensor dark for one or fewer steps. The matrix printer's own printing also keeps the reflected light to the sensor dark for one or fewer steps. By contrast, the second kind of pre-printing is in thick, bold type and keeps the light reflected into the sensor dark for four or more steps of the sensor across the passbook. In this way, the sensor can detect the mark.

The passbook is provided with two dense marks such that one lies at the top and one at the bottom of one of the pages when the passbook is open. Dependent upon whether the sensor detects a mark far removed from the point where it first detects the edge of the passbook or detects a mark close to the point whereat it first detects the edge of the passbook, or detects two marks in its sweep across the passbook or detects no mark at all in its sweep across the passbook, so the sensor is able to detect which of the four possible edges of the passbook has become aligned with the barrier. The control characters from the character generator feeding the printhead matrix printer are accordingly swung around to accord with the appropriate direction of presentation of the passbook and the printhead and drive rollers controlled to print the desired row of characters in the passbook regardless of the orientation of the passbook.

The invention is further explained by way of an example in the following description in conjunction with the appended drawings in which:

FIGS. 5A to 5D show a plan view of the assembly of FIG. 1 with the clamp roller assemblies removed showing how a passbook becomes aligned on the conveyor belt.

FIG. 6 shows detail of the printing of the passbook for use with the preferred embodiment of the present invention.

Figure 1:
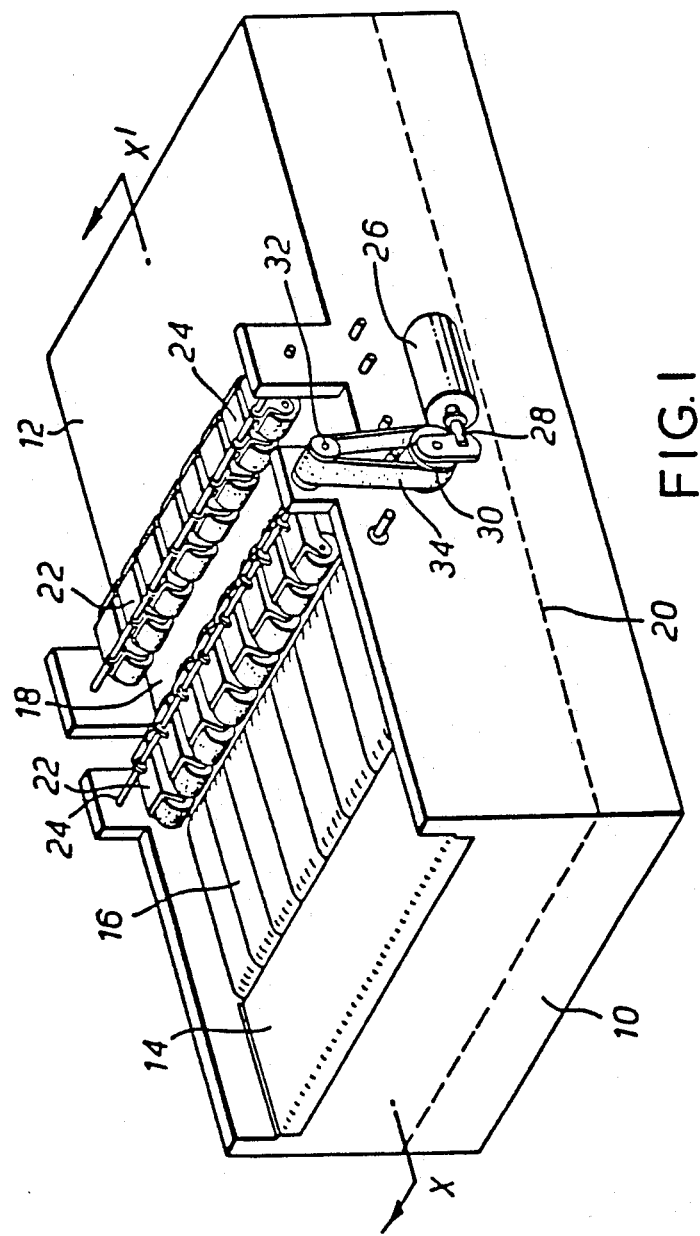
FIG. 1 shows a projected view of the lower half of the preferred embodiment of the present invention with cover removed.

FIG. 1 shows a projected view of the preferred embodiment of the present invention with cover removed. The preferred embodiment consists in a base 10 having a top thereof, a flat bed 12 comprising a feed tray 14, a conveyor belt 16 and a printing bed 18. The base 10 is normally sunk into a recess on a support table up to a position indicated by a dotted line 20. It is to be understood that the base 10 can be sunk until the feed tray 14 becomes level with the supporting table to provide an extended feed area.

Clamp roller assemblies 22 are rotatable about clamp rods 24 to form a first part of a passbook transport apparatus. The clamp rods 24 are shown by way of example as being rotatable by a solenoid 26 pulling on a bell crank 28 to rotate a first pulley 30 and thereby rotate a second pulley 32 through the medium of a connecting belt 34 for the second pulley 32 to rotate the clamp rod 24. Those skilled in the art will be aware of other means whereby the clamp rods 24 may be rotated. As will later become clear, only the leading clamp rod 24 nearer to the conveyor belt 16 need be rotatable, the clamp roller assemblies 22 on the transport apparatus remote from the conveyor belt 16 being usable in permanent engagement with their associated drive rollers.

Figure 2:
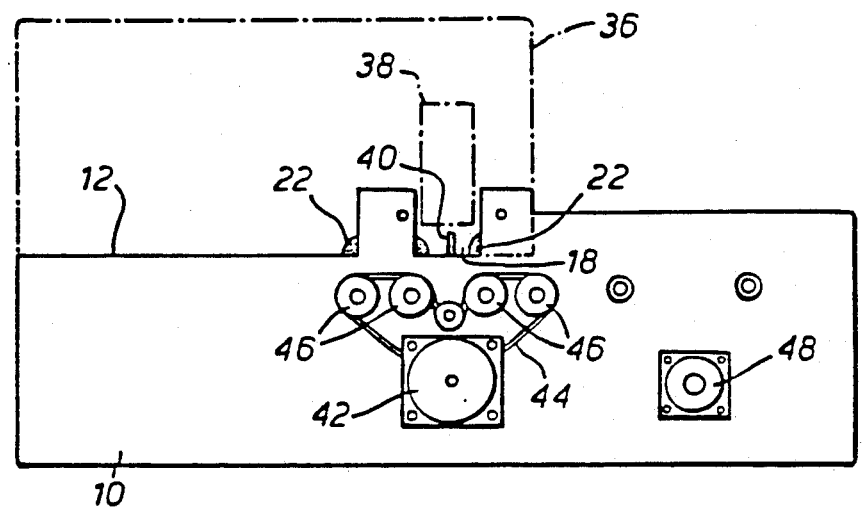
FIG. 2 shows an elevated view of the preferred embodiment of FIG. 1 from the opposite side to that shown in FIG. 1 with the outline of the cover shown in phantom.

FIG. 2 shows an elevation of the assembly of FIG. 1 with a cover 36 and printhead assembly 38 shown in phantom outline. A barrier 40 is raisable between the clamp roller assemblies 22 in the printing bed 18. A first drive motor 42, a stepping motor, drives a first toothed belt 44 in common about drive roller pulleys 46 so that all four drive roller pulleys 46 move in concert. A second drive motor 48 drives the conveyor belt 16 and can range in its type from a stepping motor to a simple electical motor.

Figure 3:
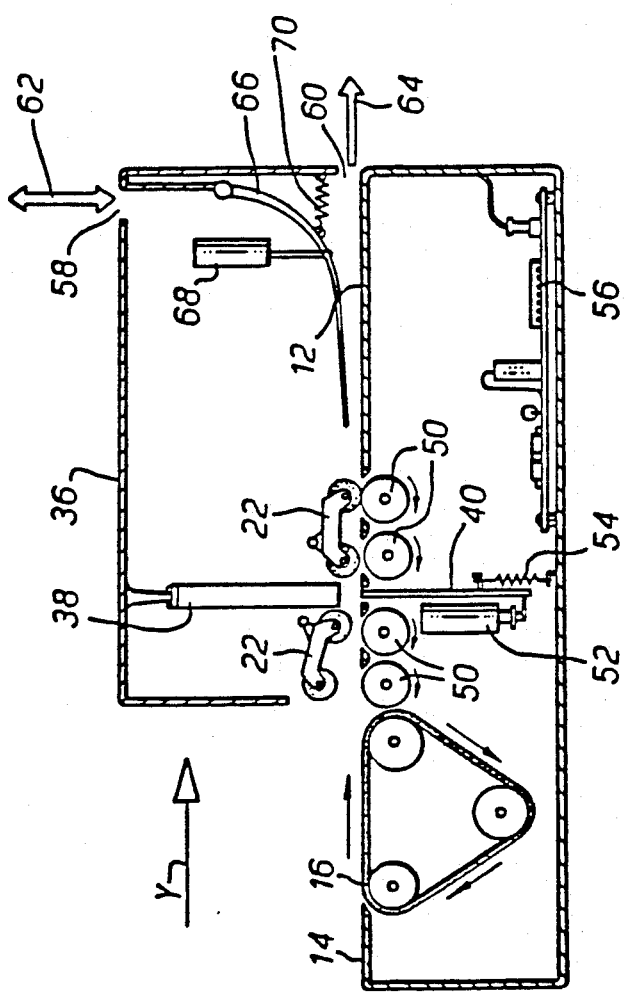
FIG. 3 shows a cross-sectional view of the entire apparatus of the preferred embodiment of the present invention taken along the line X—X' of FIG. 1 looking in the direction of the arrows.

FIG. 3 shows a cross-sectional view of the complete apparatus, the cross-section being taken through that part of the preferred embodiment indicated in FIG. 1 by the line X—X' looking in the direction of the arrows.

The drive roller pulleys 46 rotate the drive rollers 50 as indicated. When the clamp roller assembly 22 most proximate to the conveyor belt 16 is lowered onto its associated drive rollers 50, it assumes the position shown for the clamp roller assembly 22 more distant from the conveyor belt 16. A bank passbook may be gripped between the clamp roller assembly 22 and its attendant drive rollers 50 to be advanced or withdrawn in the apparatus with precision by the stepping of the first drive motor 42.

The barrier 40 can be raised by a simple second solenoid 52 returnable by means of a first spring 54. When the second solenoid 52 is energized, the barrier 40 is interposed in the path of a passbook, as will later be described, beneath the printhead assembly 38.

The preferred embodiment further comprises an electronic assembly 56 whose function in controlling the printhead assembly 38 and the various motors 42,48 will be later described.

A passbook introduced on the feed tray 14 onto the conveyor belt 16 may (after printing) either be returned from whence it came back onto the feed tray 14 by reverse action of the transport apparatus consisting in the clamp roller assemblies 22 and the drive rollers 50, together with possible reverse action of conveyor belt 16, or may be directed through one or other of a first rear aperture 58 or a second rear aperture 60 as indicated respectively by a first arrow 62 and a second arrow 64, by means of a deflecting blade 66 which may be raised into an upper position by a third solenoid 68 to allow the passbook to pass through the second rear aperture 60 or which can be, in absence of energization of the third solenoid 68, be returned by a second spring 70 onto the flat bed 12 to divert the passbook up through the first rear aperture 58. As indicated by the second arrow 64, a passbook may also be inserted through the first rear aperture 58 to slide down the deflecting blade 66 to engage the transport apparatus 22,50 to be printed by the passbook printer. As will later become clear, for this to be effective, the transport apparatus 22,50 must transport the passbook right onto the conveyor belt 16 for the passbook to be treated thereafter in a conventional manner to be described hereafter.

Figure 4:
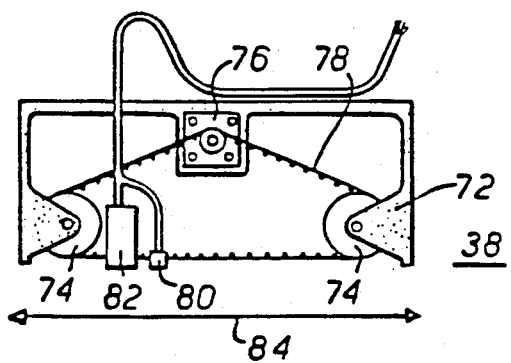
FIG. 4 shows a view of the printhead assembly shown in FIG. 3 and shown in phantom in FIG. 2 looking in the direction of the arrow Y of FIG. 3.

FIG. 4 shows a view of the printhead assembly 38 of FIGS. 2 and 3 looking in the direction of the arrow Y in FIG. 3.

The printhead assembly 38 comprises a support yoke 72 for holding cog wheels 74 and stepping motor 76, respectively, holding and driving a second toothed belt 78 transversely to the motion of the conveyor belt 16. The second toothed belt 78 supports a sensor 80 and a matrix printhead 82. The sensor 80 and the matrix printhead 82 are spaced apart by a known number of steps of the stepping motor 76. Thus, if the sensor 80 passes a point, the stepping motor 76 has only to step by the known predetermined number of steps to bring the matrix printhead 82 over the same point.

The sensor 80 is a reflective optical sensor. This form of sensor is well known in the art. A focused beam of light is sent out from a light emitting diode focused onto a spot a predetermined distance in front of the sensor 80. A focussed photodetector, also in the sensor 80, views the same spot whereat the light from the light emitting diode or other light source is focused. When a target such as a piece of paper is placed at or near the focused light area, the photodetector detects light and conducts current. The current is turned into a voltage by means of resistors, amplifiers and the like and can be turned into logic levels for control purposes by comparators. Printing on the paper causes the light from the light source in the sensor 80 to be momentarily obscured for the photodetector in the sensor 80 to detect a darkness condition. When no target paper is in the focused light area, once again the sensor 80 detects a darkness condition. Thus, as the sensor passes a paper surface it passes from detecting darkness to brightness as it encounters the paper surface and detects darkness at those points on the paper surface whereat printing of sufficient density is to be found.

The matrix printhead 82 is a conventional matrix printhead known in the art. The printhead comprises a plurality of parallel needles each individually activatable to strike an ink ribbon against the item whereon printing is to be provided in a pattern making characters readable to a passbook user. At each step of the stepping motor 76, a different array of needles in the matrix printhead 82 is selected to make that particular portion of the character currently being printed as the matrix printhead 82 moves to and fro as indicated by the bidirectional arrow 84. It is known in the art to use as the array of dots making each printed character an array nine characters high by seven characters wide. An integrated circuit memory in the electronic assembly 56 keeps a record of the patterns for each character and as each character is called out, the electronic assembly 56 drives through electronic switches and solenoids the individual needles in the matrix printhead 82 to create the characters. As will later be described, the electronic assembly 56 further possesses the ability to select one of four different sets of patterns dependent upon the detected orientation of a passbook in the passbook printer.

Figure 5A:
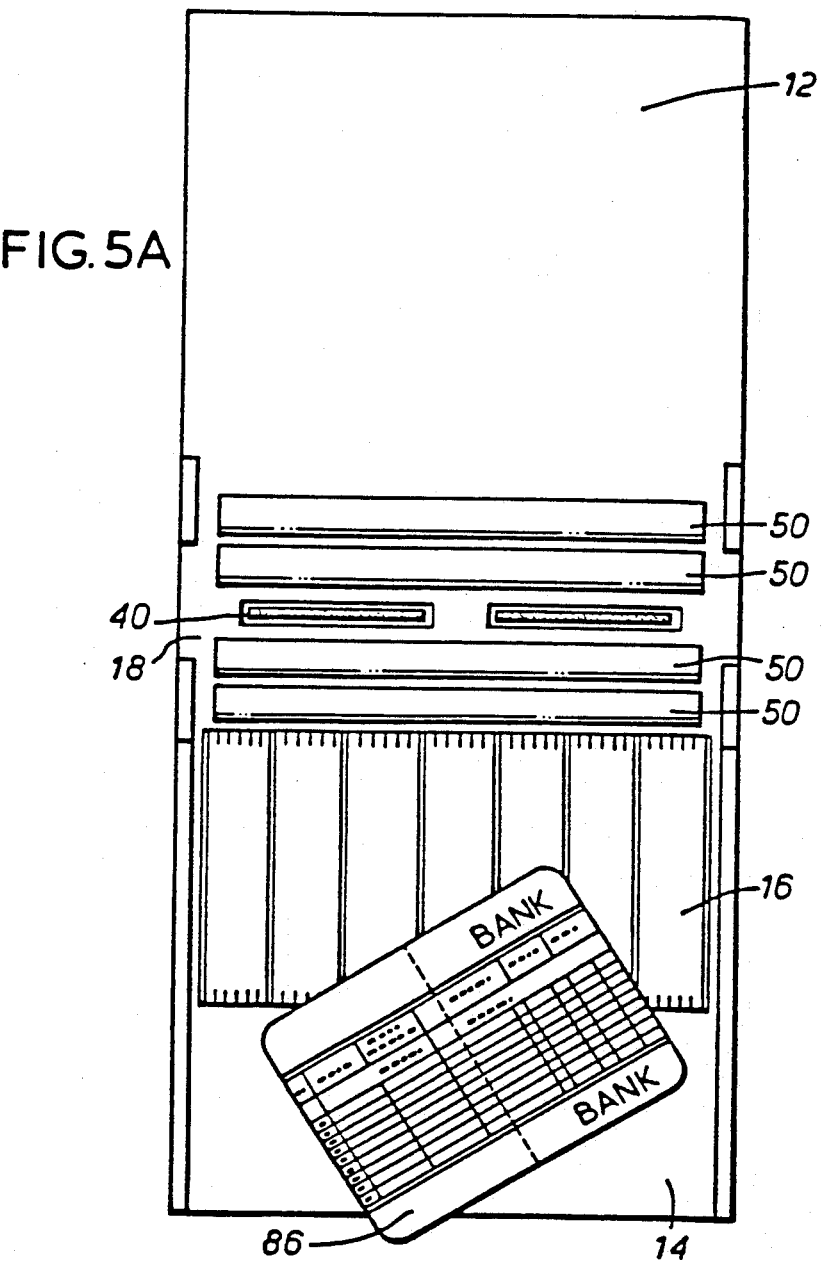

FIG. 5A shows a plan view of the apparatus of FIG. 1 with the clamp roller assemblies 22 removed. The passbook 86 is placed upon the feed tray 14 and a portion of the passbook 86 urged to engage the conveyor belt 16. The operator of the passbook printer then provides indication that a printing operation is to be executed. The indication may be automatically by detection of the passbook 86 on the feed tray 14 or may be provided by switch or through communication through the teller's keypad. It does not matter from the point of view of the present invention how that indication is provided. In a first action, the passbook printer raises the barrier 40 through slots in the printing bed 18 of the flat bed 12. The barrier 40 lies across the path of the conveyor belt 16.

Figure 5B:
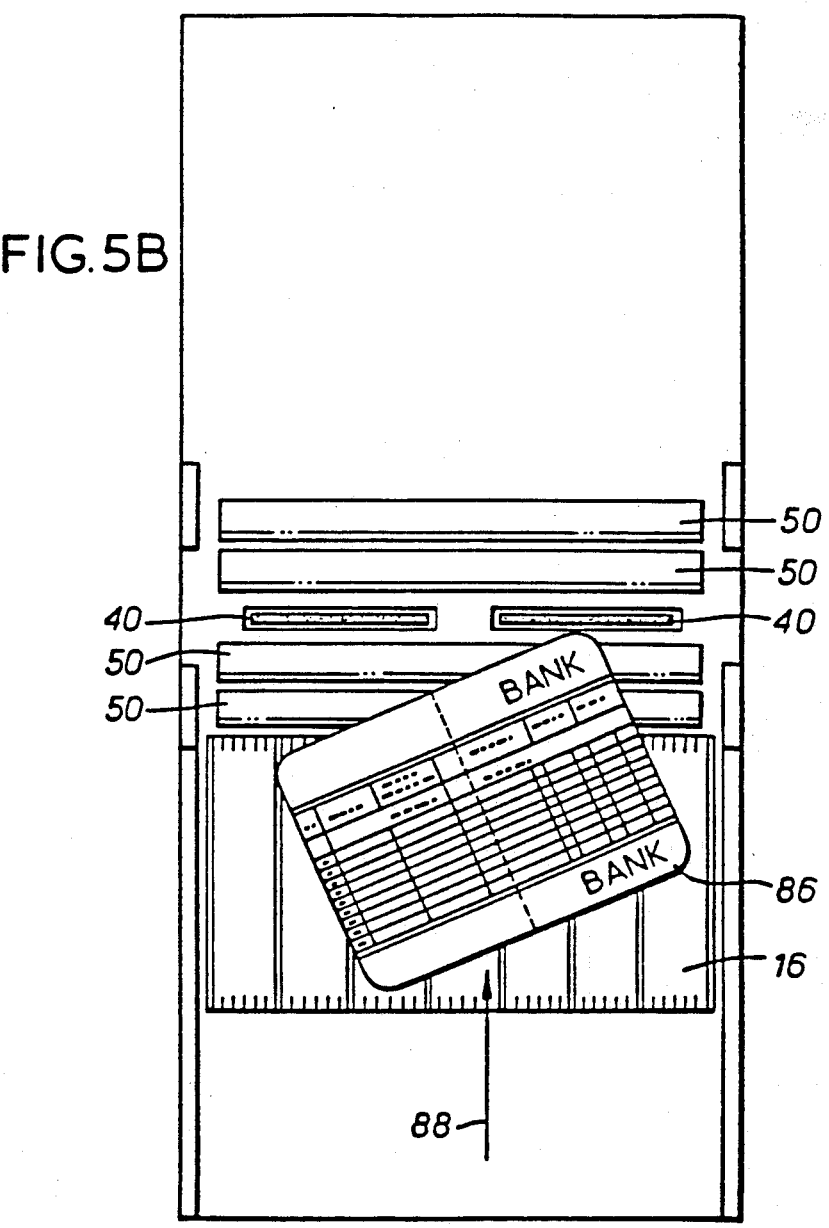

FIG. 5B shows the next stage of operation. The conveyor belt 16 is activiated to drive the passbook 86 by frictional coupling in the direction of the third arrow 88 until a corner of the passbook 86 engages the raised barrier 40.

FIG. 5C shows the next stage in alignment of the passbook 86 against the barrier 40. The conveyor belt 16 continues to move after the corner of the passbook 86 has first engaged the barrier 40. Frictional coupling between the conveyor belt 16 and the passbook 86 causes the remaining portion of the passbook 86 which has not engaged the barrier 40 to swing round as indicated by the fourth curved arrow 90 to align one of the edges of the passbook 86 with the barrier 40. The conveyor belt 16 is maintained moving for a predetermined time at least equal to the amount of time required for the sequence of actions shown in FIGS. 5A to 5C. In practice, an excess allowance of time is provided so that the consequences of inattentiveness or poor frictional coupling may be avoided.

Figure 5D:
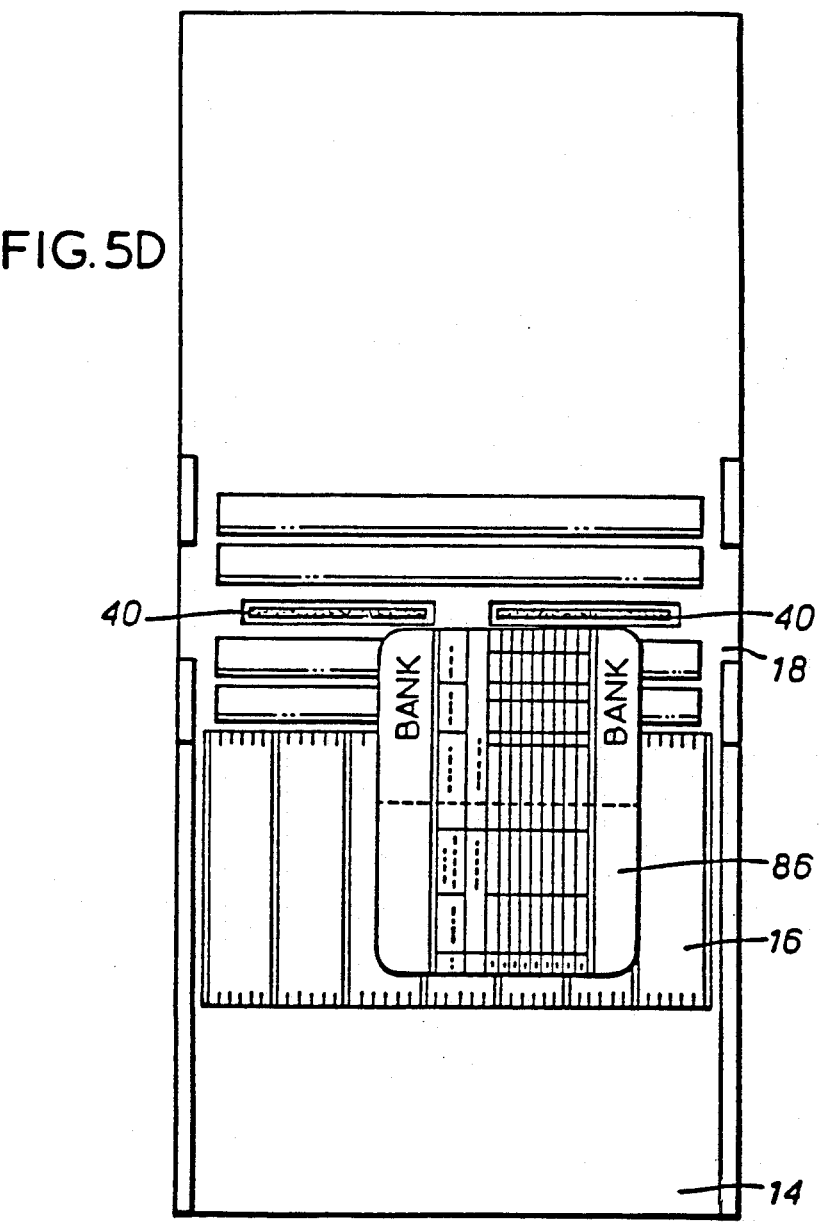

FIG. 5D corresponds to FIG. 5C except in that the passbook 86 has become aligned with the barrier 40 with a different edge of the passbook 86 in alignment with the barrier 40. This different situation is in consequence of the passbook 86 having been at a different angle on the feed tray 14 from that depicted in FIG. 5A. It is to be appreciated that the passbook 86 if merely slid onto the feed tray 14 may end up with any one of its four edges aligned against the barrier 40. Whilst it is possible to detect alignments other than that shown in FIG. 5C and not print the passbook 86, the present invention seeks to provide that the passbook 86 may be printed whatever the alignment thereof against the barrier 40.

When the passbook 86 is aligned against the barrier 40, there is an uncertainty as to its transverse position on the conveyor belt 16. Accordingly, the sensor 80 on the printhead assembly 38 is employed not only to detect the orientation of the passbook 86, but also to detect the position of the passbook 86 transversely to the direction of movement of the conveyor belt 16.

Once the passbook 86 has become aligned against the barrier 40 further movement of the conveyor belt 16 ceases. The barrier 40 is lowered. The passbook 86 is, therefore, able to continue in its progress across the printing bed 18. To facilitate this movement, the clamp roller assembly 22 closest to the conveyor belt 16 is lowered by rotation of its associated clamp rod 24 through action of the solenoid 26. The first drive motor 42 is activated to advance the passbook 86 a predetermined number of steps under the printhead assembly 38 for the printhead assembly 38 to commence a scanning operation.

The printhead assembly 38 is first taken to its home position to one side of the passbook printer. The sensor 80 and the matrix printhead 82 are then moved together across the passbook 86. When the sensor 80 first detects reflected light it knows which step of the stepping motor 76 whereat the passbook 86 commences.

FIG. 6 shows details of the passbook 86. If the passbook 86 ends up with a first edge 92 thereof aligned against the barrier 40, the sensor 80 executes the line P—P'. The electronic assembly 56 starts a step count S of the stepping motor 76 whenever the photosensor 80 detects the edge of the passbook 86. The photosensor 80 detects no printing except that of a first dense mark 94. The first dense mark 94 takes the form of bold letter printing. The width of the printed lines are such that the photosensor in maintaining its count of the steps S detects darkness for four or more steps. Depending upon the thickness of the printing, this number can be changed according to the desire of the particular design. In the line P—P', if the dense printing of the first dense mark 94 is not encountered before the step count S has exceeded a first predetermined count A, then it is a sure indcation that the passbook 86 has been aligned with its first edge 92 up against the barrier 40.

If the passbook 86 has been aligned with its second edge 96 against the barrier 40, the sensor 80 will excute the line T—T' across the passbook 86. The ordinary printing on the passbook and previous printing by the matrix printhead 82 are of such a thickness that the sensor 80 does not see darkness for the requisite number of four steps. Accordingly, all ordinary printing upon the passbook 86 is ignored by the sensor 80. Thus, in executing the line T—T' the sensor 80 sees no dense mark 94 whatever. In seeing no dense mark 94 in the totality of its possible excursion of steps $S_{MAX}$ the passbook printer may be certain that the passbook 86 has been aligned with its second edge 96 against the barrier 40.

If the passbook 86 has been aligned with a third edge 98 against the barrier 40, then the sensor 80 executes the line Q—Q' across the passbook 86. The passbook 86 is provided with a second dense mark 100 similar to the first dense mark 94 and immediately therebelow. The sensor 80, therefore, encounters two dense marks along the line Q—Q'. In detecting the two dense marks, the passbook printer may be sure that the third edge 98 of the passbook 86 was the one that came into alignment with the barrier 40.

If the passbook 86 has been aligned with a fourth edge 102 against the barrier, then the sensor 80 executes the line R—R' across the passbook 86. In so doing, it detects the second dense mark 100 very early in its execution of the line R—R'. In fact, it detects the second dense mark in less than a second predetermined number of steps W of the stepping motor 76 from the point where the sensor 80 first detected the edge of the passbook 86. When the passbook printer detects a dense mark less than the second predetermined number of steps W from the point whereat the sensor 80 first detected the edge of the passbook 86, it can be sure that the passbook 86 has become aligned with the fourth edge 102 thereof having been up against the barrier 40.

In this manner, the passbook printer is able to detect which way round the passbook 86 has been aligned.

Figure 7A:
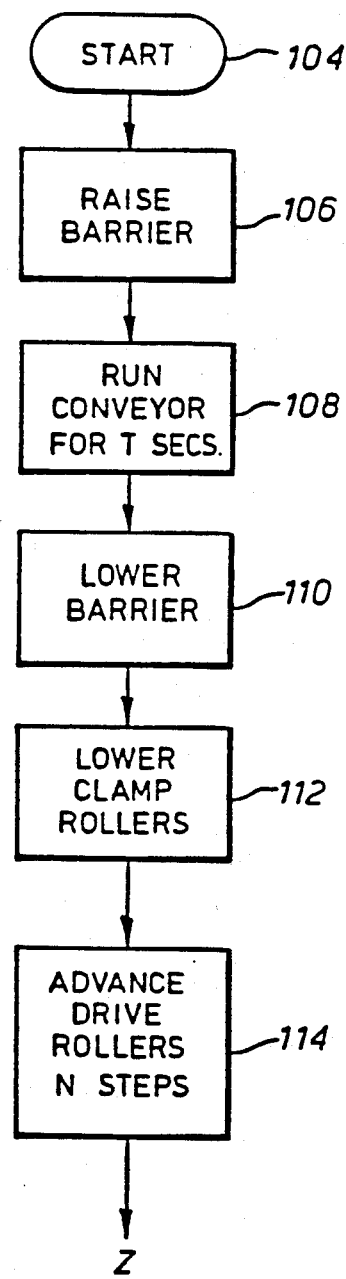
FIGS. 7A to 7F are flowcharts indicating the manner of operation of the preferred embodiment of the present invention.

FIG. 7A shows a first portion of a flowchart indicating the activities of the electronic assembly 56 in controlling the passbook printer. From a start operation 104, the electronic assembly 56 goes to a first operation 106 where it raises the barrier 40. Thereafter, the electronic assembly 56 performs a second operation 108 wherein the conveyor 16 is run for a predetermined number of seconds long enough to align the passbook 86 against the barrier 40. Thereafter, the electronic assembly 56 commands the second solenoid 52 to be de-energized for the first spring 54 to lower the barrier 40 in a third operation 110. Thereafter, the electronic assembly 56 energizes the solenoid 26 in a fourth operation 112 for the clamp rollers 22 to grip the passbook 86 against the drive rollers 50.

Finally, the elcetronic assembly 56 performs a fifth operation 114 to advance the drive rollers 50 through a predetermined number M of steps of the first drive motor 42 to bring the passbook 86 into one of the positions relative to the sensor 80 indicated in FIG. 6.

Figure 7B:
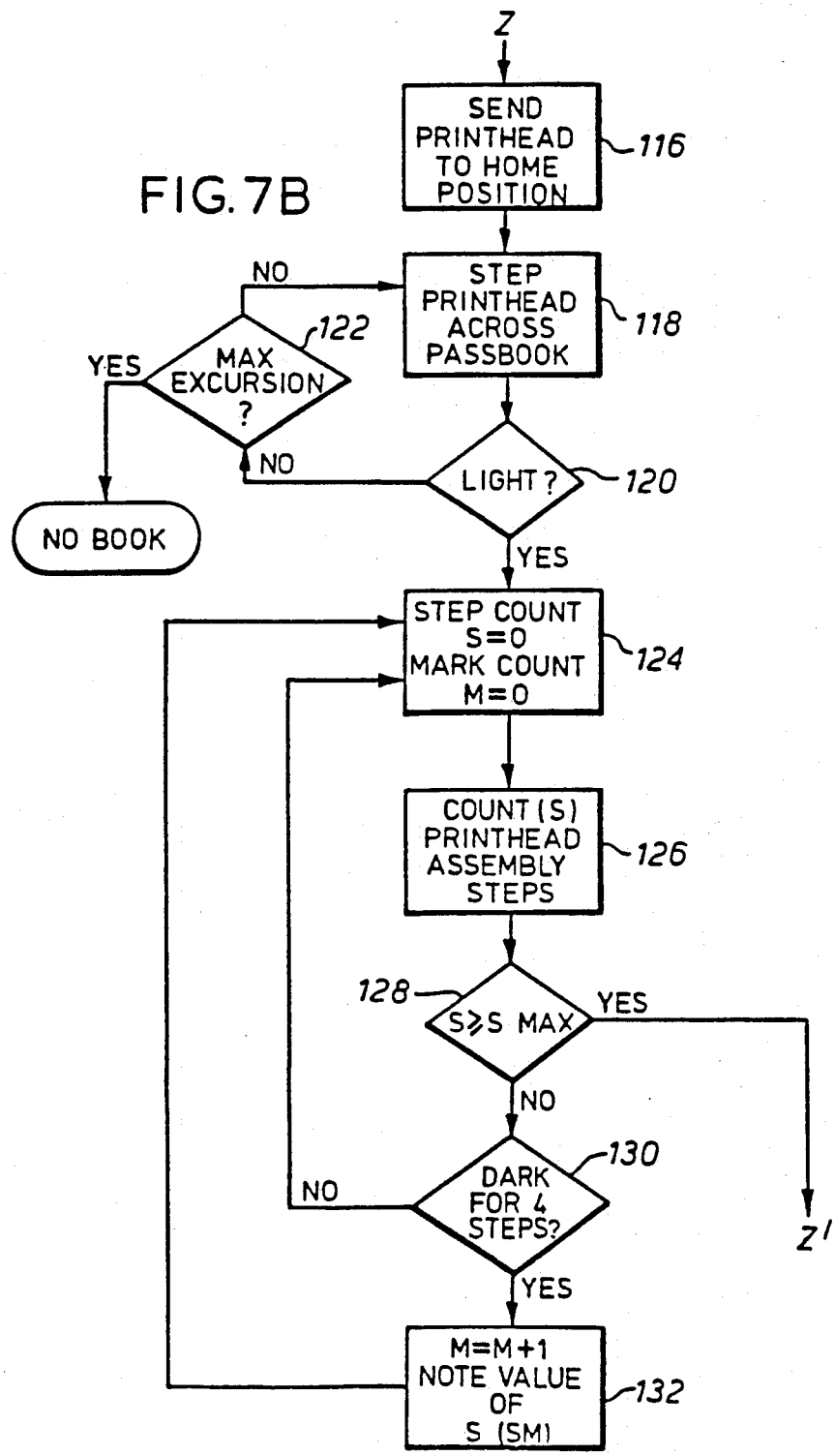

FIG. 7B shows further portions of the operation of the electronic assembly 56. Having advanced the passbook 86, the electronic assembly 56 performs a sixth operation 116 to send the printhead assembly 82, 80 to its home position at the extreme lefthand side of FIG. 4 as it is shown. This may be accomplished by stepping the stepping motor 76 until a microswitch (not shown) makes electrical contact or simply by stepping the stepping motor 76 for a predetermined period of time to make sure that enough steps have been administered to drive the assembly 80, 82 hard against its end stop.

Having performed the sixth operation, the passbook printer through its electronic assembly 56 goes on to step the printhead assembly 80,82 across the passbook 86 in a seventh operation 118. At each step, a first test 120 of the output of the sensor 80 is made to see if the sensor 80 has detected any light. If no light has been detected, a second test is performed to see if the printhead assembly 80,82 has gone through its extreme righthand position. If not, operation passes back to the seventh operation for another step to be administered to the printhead assembly 80,82. If the maximum excursion has been reached with no light having been detected, then no passbook 86 at all has been presented to the passbook printer and indication is provided before the printer shuts down.

As soon as the sensor 80 detects light, the electronic assembly 56 starts counting the steps of the stepping motor 76 having first set the step count S equal to zero and also having set the count of the number of dense marks encountered M also equal to zero. The printhead assembly 80,82 continues to be stepped across the passbook 86 in a ninth operation 126 and its steps are counted. At each step a third test 128 is applied to see if the maximum number of steps $S_{MAX}$ has been reached. If the maximum number of steps $S_{MAX}$ has been reached, then the routine exits to the testing phase shown in FIG. 7C. If not, a fourth test 130 is applied to test if the sensor 80 has seen darkness for four or more steps. If it has not seen such darkness, then the dense mark is not encountered and control is returned to the eighth operation 124. If it has encountered the dense mark 94,100 then the dense mark count M is incremented by one and the value of the step count ($S_M$) whereat the dense mark was first encountered is noted down. All this is achieved in a tenth operation 132. Thereafter, the tenth operation 132 returns back to the eighth operation 124.

It is to be appreciated that detection of the dense mark 94,100 must be effected on the basis of its first encounter only. Those skilled in the art will appreciate that lettering and printing would otherwise interfere with the operation of this detection system by indicating the erroneous presence of many dense marks. Thus, only the first instance of a dense mark is recorded.

Figure 7C:
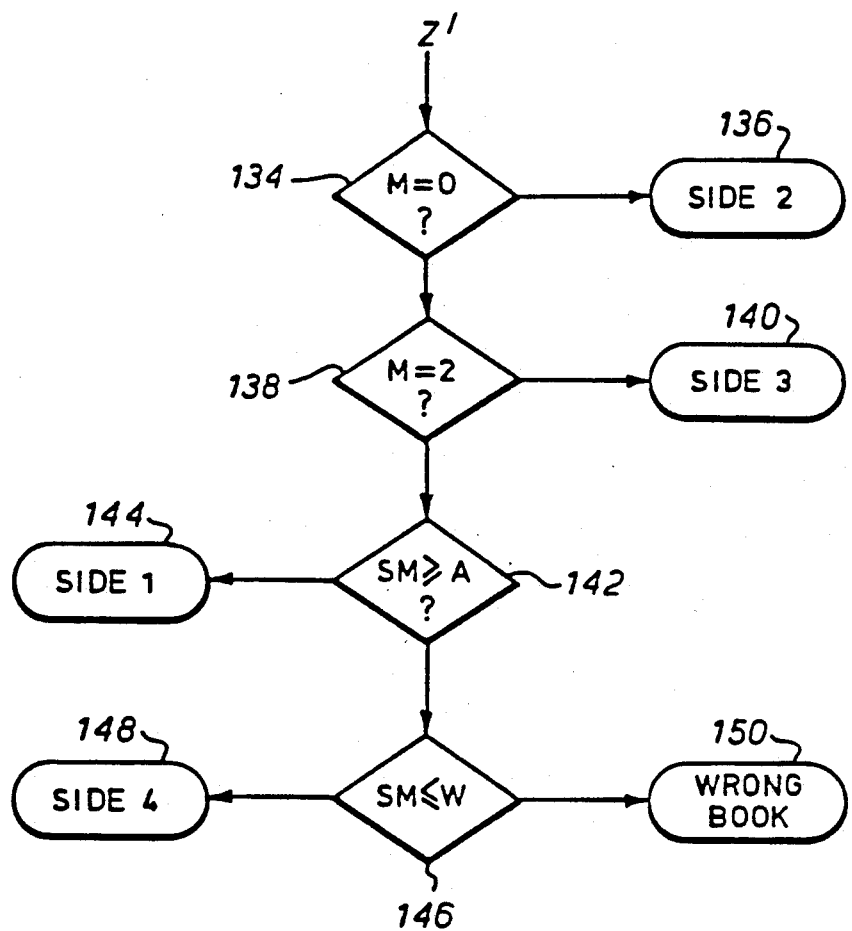

FIG. 7C shows the testing phase of the operational sequence shown in FIGS. 7A and 7B. If the third test 128 showed that the steps count S had equalled or exceeded the maximum step count $S_{MAX}$, then control is transferred to a fifth test 134 which tests if the dense mark count M is equal to 0. If the dense mark count M is equal to 0, then the passbook 86 is aligned with the second edge 96 having been presented to the barrier 40. Control is, therefore, transferred to a second edge routine 136.

If the fifth test 134 is not passed, control passes to sixth test 138. The sixth test 138 tests if the dense mark count M is equal to 2. If the dense mark count M is equal to 2, then the passbook 86 has been presented for the third edge 98 to have come into alignment with the barrier 40. The control is, therefore, passed to a third edge routine 140.

If the sixth test 138 has not been passed, control passes to a seventh test 142. The seventh test 142 tests whether the number of steps of the step count S noted down on encountering the dense mark, namely $S_M$, exceeds the first predetermined number of steps A. If it does, then control is passed to a first edge routine 144. If not, then control passes to an eighth test 146. The eighth test 146 tests whether the noted down number of steps $S_M$ was less than or equal to a second predetermined number of steps W. If it is, then control is passed to a fourth edge routine 148. If not, then there is something wrong, namely a wrong kind of book or document having been presented to the passbook printer. Thus, control passes to an error routine 150 which indicates the error and prevents any further action.

Figure 7D:
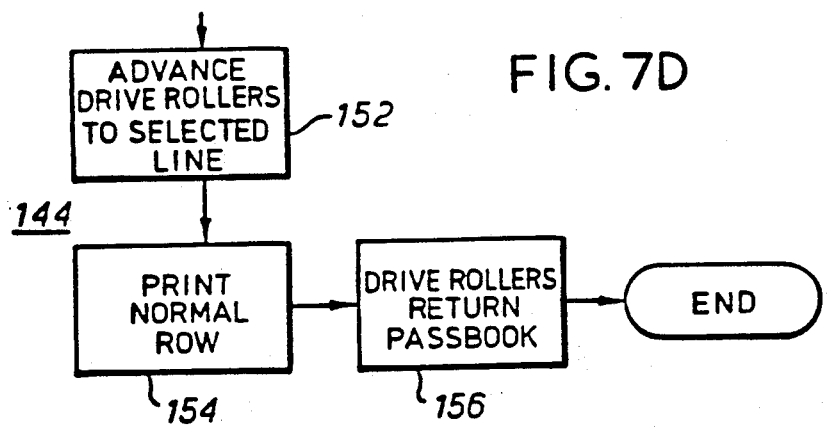

FIG. 7D shows the first edge routine 144 of FIG. 7C. In an eleventh operation 152 the electronic assembly 56 advances the drive rollers 50 by means of the first drive motor 42 to the selected line already indicated to the passbook printer by the teller using it. Thereafter, the electronic assembly 56 executes a twelfth operation 154 wherein the matrix printhead 82 is swept just once across the passbook 86 to print a normal row of upright characters. Thereafter, in a thirteenth operation 156 the drive rollers 50 are reversed as is the conveyor belt 16 to return the passbook 86 to the user. Thereafter, operation of the passbook printer ceases.

Figure 7E:
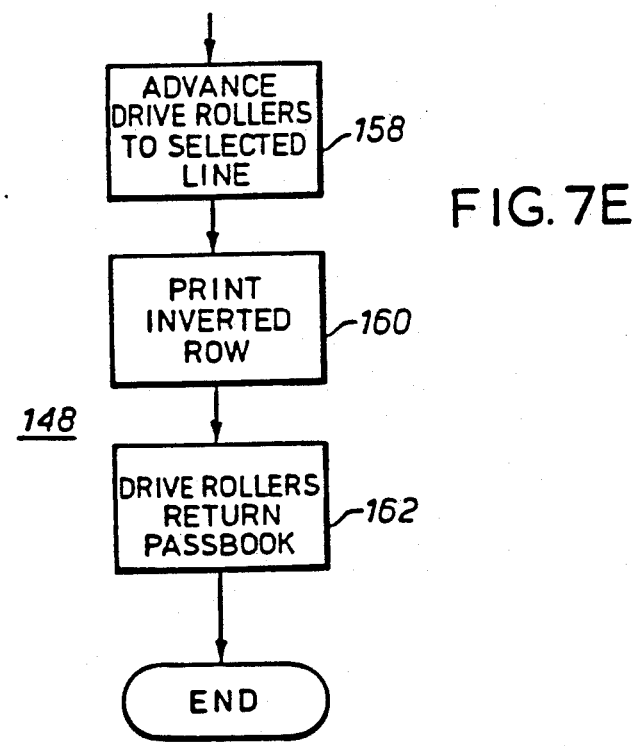

FIG. 7E shows the fourth edge routine 148 of FIG. 7C. When the fourth edge 102 is presented to the printhead assembly 38, the book is effectively upside down. The electronic assemblies 56 perform a fourteenth operation 158 to advance the drive rollers 50 to move the book for the selected line to be beneath the printhead 82. However, it does not move the book the same distance as does the eleventh operation 152 since the book is upside down and must move a different number of steps of the first drive motor 42. In the fourteenth, operation 158 the electronic assembly 56 moves the passbook 86 the required number of steps to bring the upside down desired line beneath the printhead 82. Thereafter the electronic assembly 56 performs a fifteenth operation 160 to print a single row of printing across the passbook 86, but with the matrix characters upside down with the characters from the control memory inverted such that the first row becomes the seventh row, the second row becomes the sixth row, and so on. Further, the directions left and right are changed so that the characters come out in the opposite sequence of printing. Having performed the fifteenth operation 160, the electronic assembly 56 reverses the drive rollers 50 and the conveyor belt 16 as for the thirteenth operation 156 in a sixteenth operation 162 to return the passbook 86 to the teller.

Figure 7F:
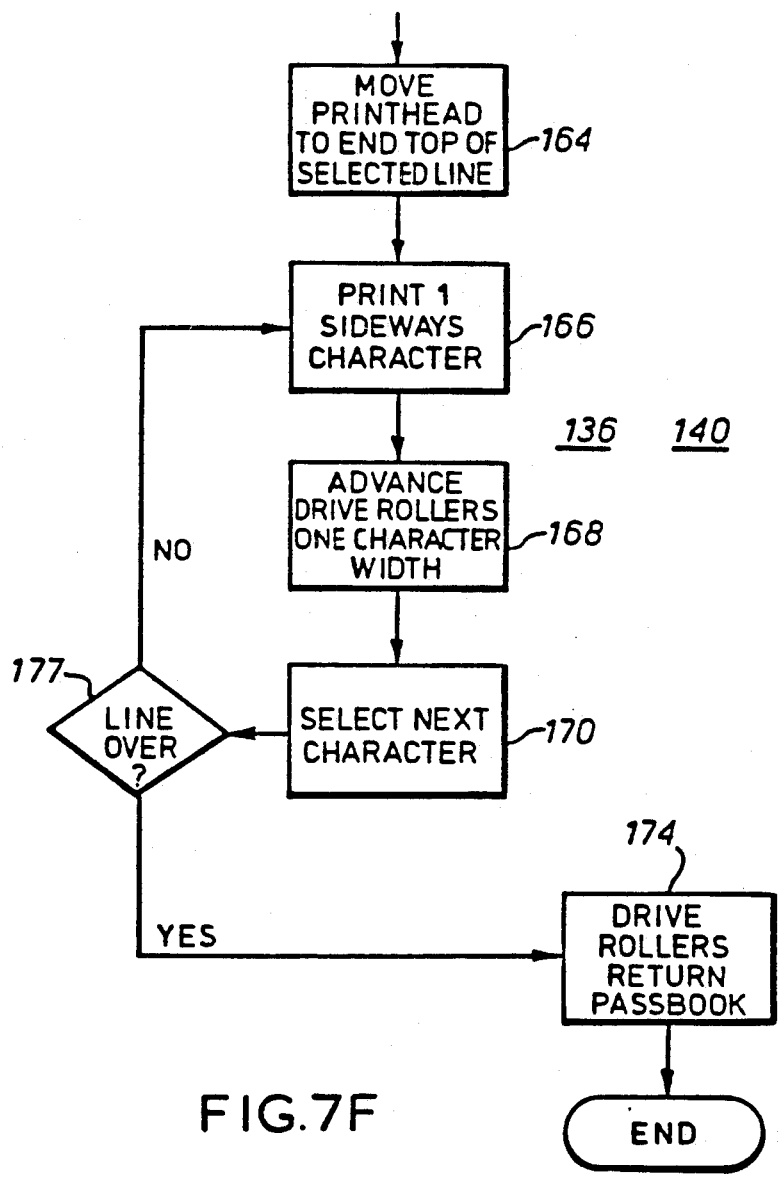

FIG. 7F shows the situation where either the second edge 96 or the third edge 98 have been aligned with the barrier 40. Thus, FIG. 7F is equally applicable as being descriptive of the second edge routine 136 or the third edge routine 140 of FIG. 7C.

In a seventeenth operation 164 the electronic assembly 56 moves the printhead 82 to be in alignment with the desired line on the passbook 86 whereat the printing is required. It is to be remembered that in both these instances the passbook is sideways on to the printhead 82. The electronic assembly 56, therefore, rescrambles the characters to be sent to the matrix printhead 82 such that the rows become columns and the comumns become rows. To print a character now, instead of the normal fashion where a printhead nine needles high is swept past seven printing positions to make a nine by seven character, in this instance the outermost two needles of the nine are disused and only the inner seven used, the printhead assembly 38 being swept through nine vertical print positions to create the character.

Thus, in an eighteenth operation 166, the printhead 82 first starts either at the top or bottom of the line to be printed and prints one character. Control is then passed to a nineteenth operation 168 wherein the electronic assembly 56 advances the drive rollers 50 to move the passbook 86 by one character width. Thereafter, in a twentieth operation 170 the next character in whichever order is required is presented for printing. If the line is not full, control is returned by a ninth test 172 to the eighteenth operation 166. If the line of printing is finished, then in a twenty-first operation 174 the drive rollers 50 and the conveyor belt 16 are reversed, once again to return the passbook 86 to the teller. It is to be appreciated that dependent upon whether FIG. 7F is taken to be representative of the second edge routine 136 or the third edge routine 140, so the columns of the characters printed upon the line in the passbook 86 will be swapped or not so that the correct upright printing of a visual record is achieved within the passbook 86.

The present invention is not restricted to banking passbooks, but may be used on any transactional document which may be printed upon presentation in a flat form to a printer.

I claim:

1. A passbook printer comprising a barrier, a horizontally positioned conveyor belt, a transport apparatus and a printhead assembly, said passbook printer further including means for raising said barrier in response to the placing of an open passbook on said conveyor belt, means for operating said conveyor belt for a predetermined period of time, whereby said conveyor belt conveys said passbook towards said barrier and into engagement with said barrier with an edge of said passbook aligned with the barrier; means for lowering said barrier, whereby said passbook becomes free to pass thereover; means for operating said transport apparatus for engaging said passbook and transporting said passbook a selectable distance along a path towards said printhead assembly;

said printhead assembly comprising a sensor, means for moving said sensor across said path and detection means, responsive to said sensor, for detecting the transverse position of said passbook;

said detection means further including means for detecting a first predetermined mark and a second predetermined mark on said passbook and means for measuring the respective distances, transverse to said path, between said point whereat said detection means detects said passbook and the point whereat said detection means detects said first mark, and between said first and second marks, in order to determine which edge of said passbook has become aligned with said barrier;

said printhead assembly further comprising a printhead for printing a visible record at a selectable distance transversely to said path from the point whereat said sensor detected said passbook.

2. A passbook printer according to claim 1 wherein said measuring means includes means, responsive to the measured distance between the point whereat said detection means detects said passbook and the point whereat said detection means detects one of said marks being in excess of a first predetermined distance, for determining that a first edge of said passbook has become aligned with said barrier.

3. A passbook printer according to claim 2 wherein said measuring means includes means, responsive to said detection means having detected no mark subsequently to said detection means having detected said passbook and having moved thereafter transversely to said path more than a second predetermined distance, for determing that a second edge of said passbook has become aligned with said barrier.

4. A passbook printer according to claim 3 wherein said measuring means includes means, responsive to the distance between said point whereat said detection means detects said passbook and said point whereat said detection means detects one of said marks being less than a third predetermined distance and only one of said marks being detected in said second predetermined distance, for determining that a third edge of said passbook has become aligned with said barrier.

5. A passbook printer according to claim 4 wherein said measuring means includes means, responsive to said detection means detecting two of said marks within said second predetermined distance, for determing that a fourth edge of said passbook has become aligned with said barrier.

6. A passbook printer according to claim 5 wherein said printhead assembly comprises a matrix impact printer, means for passing said matrix impact printer over said passbook transversely to said path in one or more printing runs, character memory means for controlling said matrix printhead, said character memory means responsive to which edge of said passbook is detected as having become aligned with said barrier, to select an appropriate control sequence from among a plurality of control sequences for said printhead to print upright upon the passbook regardless of which edge of said passbook has become aligned with said barrier.

7. A passbook printer according to claim 6 wherein said plurality of control sequences includes means for causing said printhead to pass across said passbook to print a single row of inverted characters and means for cuasing the repeated passing of said printhead across a selected portion of said passbook, each time to print a single sideways character, said transport apparatus including means for advancing said passbook towards said printhead between each printing of one of said sideways characters.

8. A passbook printer according to claim 1 wherein said conveyor belt comprises a plurality of individual belts in parallel.

9. A passbook printer according to claim 1 wherein said printhead assembly comprises a common belt for the support both of said sensor and of said printhead, and a stepping motor for driving said common belt transversely to said path.

10. A passbook printer according to claim 9 wherein said measuring means includes means for measuring distances transversely to said path in terms of the number of steps taken by said stepping motor to drive said common belt transversely to said path.

11. A passbook printer according to claim 10 wherein said sensor is separated from said printhead on said common belt by a predetermined number of steps, whereby said printer can calculate the position of said printhead relative to the passbook subsequently to said detection means detecting the passbook.

12. A method of printing a line of information on a document, said document having first and second opposed edges and third and fourth opposed edges, said line of information to be printed between said third and fourth edges with the top of said line of information opposing said first edge, said document positioned below a printing mechanism with one of its edges aligned against a reference line, said method including the steps of:
   a—determining if the aligned document edge is said first edge;
   b—if the aligned document edge is said first edge, printing said line of information parallel to said aligned document edge with the top of said line of information opposing said aligned document edge;
   c—if the aligned document edge is not said first edge, determining if the aligned document edge is said second edge;
   d—if the aligned document edge is said second edge, printing said line of information parallel to said aligned document edge with the bottom of said line of information opposing said aligned document edge.

13. The method in accordance with claim 12 further including the steps of:
   e—if the aligned document edge is not said first or said second document edge, determining if the aligned document edge is said third edge;
   f—if the aligned document edge is said third edge, printing said line of information perpendicular to said aligned document edge with the beginning of said printed line of information adjacent said aligned document edge;
   g—if the aligned document edge is not said first or said second or said third document edge, printing said line of information perpendicular to said aligned document edge with the end of said printed line of information adjacent said aligned document edge.

14. The method in accordance with claim 13 wherein said step f includes the following substeps:
   i—printing a first symbol of said line of information perpendicular to said aligned document edge;
   ii—longitudinally transporting said document towards said printing mechanism by a distance corresponding to a single print symbol position;
   iii—printing a next symbol of said line of information perpendicular to said aligned document edge;
   iv—repeating said substeps ii and iii until the last symbol of said line of information has been printed.

15. The method in accordance with claim 14 wherein said step g includes the following substeps:
   v—printing a last symbol of said line of information perpendicular to said aligned document edge;
   vi—longitudinally transporting said document towards said printing mechanism by said distance corresponding to said single print symbol position;
   vii—printing a next symbol of said line of information perpendicular to said aligned document edge;
   viii—repeating said substeps vi and vii until the first symbol of said line of information has been printed.

16. An apparatus for printing on a document, comprising:
   printhead means for printing information on said document;
   feeder tray means for horizontally transporting said document from an initial position towards said printhead means and to an aligned position;

barrier means, positioned between said feeder tray means and said printhead means, for positioning said document with one of its edges in said aligned position; and transport means, positioned adjacent to said barrier means, for transporting said document from said aligned position to a first position below said printhead means;

said printhead means including a printhead, sensor means for detecting reference marks on said document, and printhead control means, responsive to said transport means having transported said document to said first position, for moving said printhead and said sensor means across said document along a path corresponding to said first position;

said printhead control means including means, responsive to said sensor means, for detecting an edge of said document, for detecting the presence or absence of any of said reference marks across said document along said path corresponding to said first position, and for determining the distance between said detected edge and each of said any reference marks;

said printhead control means further including means, responsive to the number and distance between any of said reference marks detected, for determining whether the aligned edge of said document is a first edge, a second edge, a third edge or a fourth edge, said first edge defining a top boundary of said document, said second edge defining a bottom boundary of said document, said third edge defining a right boundary of said document and said fourth edge defining a left boundary of said document;

said printhead control means further including means, responsive to the determination whether the aligned edge of said document is said first edge, said second edge, said third edge or said fourth edge, for controlling said printhead to print a line of information across said document and parallel to said first edge;

said printhead control means further including means, responsive to said second edge being said aligned edge, for controlling said printhead to print said line of information upside down with respect to said aligned edge.

17. The apparatus in accordance with claim 16 wherein said printhead control means includes:

means, responsive to said aligned edge being said third edge, for controlling said printhead to print said line of information perpendicular to said aligned edge, starting with a last symbol of said line of information being printed first in a position proximate said aligned edge and continuing until a first symbol of said line of information is printed last in a position proximate said fourth edge; and means, responsive to said aligned edge being said fourth edge, for controlling said printhead to print said line of information perpendicular to said aligned edge, starting with said first symbol being printed first in said position proximate said aligned edge and continuing until the last symbol is printed last in a position proximate said third edge.

18. The apparatus in accordance with claim 16 wherein:

said feeder tray means includes a conveyor belt;

said barrier means includes a barrier and a barrier control means, said barrier control means responsive to said document being placed on said conveyor belt, for raising said barrier and thereafter activatating said conveyor belt, whereby said document is fed to a position where said one of said document edges is aligned against said barrier.

19. The apparatus in accordance with claim 18 wherein said barrier control means includes means for activating said conveyor belt for a sufficient time to assure that said one edge of said document is aligned against said barrier.

20. The apparatus in accordance with claim 19 wherein said barrier control means further includes means, responsive to having activated said conveyor belt for said sufficient time, for lowering said barrier.

21. The apparatus in accordance with claim 20 wherein said barrier control means includes means, responsive to the lowering of said barrier, for activating said transport means, whereby said document is transported to said first position.

22. The apparatus in accordance with claim 18 wherein said conveyor belt is substantially wider than the length and width of said document.

* * * * *